(12) United States Patent
Tappin

(10) Patent No.: US 11,188,833 B1
(45) Date of Patent: *Nov. 30, 2021

(54) REAL-TIME PREDICTIVE KNOWLEDGE PATTERN MACHINE

(71) Applicant: Birdview Films, LLC, Malibu, CA (US)

(72) Inventor: Isabella Tappin, Malibu, CA (US)

(73) Assignee: BIRDVIEW FILMS. LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,876

(22) Filed: May 14, 2021

Related U.S. Application Data

(63) Continuation-in-part of application No. 17/159,707, filed on Jan. 27, 2021, which is a continuation of
(Continued)

(51) Int. Cl.
*G06N 5/02* (2006.01)
*G06F 16/248* (2019.01)
(Continued)

(52) U.S. Cl.
CPC .......... *G06N 5/022* (2013.01); *G06F 3/0482* (2013.01); *G06F 16/248* (2019.01); *G06F 16/24534* (2019.01); *G06F 40/30* (2020.01)

(58) Field of Classification Search
CPC ............. G06N 5/022; G06F 16/24534; G06F 16/248; G06F 40/30; G06F 3/0482
See application file for complete search history.

(56) References Cited

U.S. PATENT DOCUMENTS

2005/0102282 A1* 5/2005 Linden .............. G06F 16/90324
2014/0278755 A1* 9/2014 Eberl ................ G06F 16/24556
705/7.29
(Continued)

FOREIGN PATENT DOCUMENTS

WO WO-2020162943 A1 * 8/2020 ........... G06Q 10/067

OTHER PUBLICATIONS

Hayat, Malik Khizar, Ali Daud, Abdulrahman A. Alshdadi, Ameen Banjar, Rabeeh Ayaz Abbasi, Yukun Bao, and Hussain Dawood. "Towards deep learning prospects: insights for social media analytics." IEEE Access 7 (2019): 36958-36979. (Year: 2019).*
(Continued)

*Primary Examiner* — Alexey Shmatov
*Assistant Examiner* — Casey R. Garner
(74) *Attorney, Agent, or Firm* — Crowell & Moring LLP

(57) ABSTRACT

The disclosure below describes a knowledge pattern machine that goes beyond and is distinct from a traditional search engine as simple information aggregator. Rather than acting as a search engine of the data itself, the knowledge pattern machine use variously layers of artificial intelligence to discover correlations within the queries and historical data, and to derive and recognize data patterns based on user queries for predictively generating new knowledge items or reports that are of interest to the user. Previous patterns and knowledge items or reports are accumulated and incorporated in identification of new data patterns and new predictive knowledge items or reports in response to future user queries, thus providing a stateful machine. The predictive knowledge items are updated in real-time without user interference as the underlying data sources evolve overtime. The data patterns and knowledge items are organized hierarchically and dynamically and may be shared among different users at various levels. This disclosure thus provides
(Continued)

a pattern recognition machine with predictive analytics for enabling users to conduct research and to obtain and share unique real-time predictive data report based on intelligently processing user input queries.

25 Claims, 10 Drawing Sheets

Related U.S. Application Data application No. 17/090,625, filed on Nov. 5, 2020, now Pat. No. 10,943,172.

(51) Int. Cl.
*G06F 3/0482* (2013.01)
*G06F 40/30* (2020.01)
*G06F 16/2453* (2019.01)

(56) References Cited

U.S. PATENT DOCUMENTS

| | | | | |
|---|---|---|---|---|
| 2015/0120711 | A1* | 4/2015 | Liensberger | G06F 15/16 707/722 |
| 2017/0124487 | A1* | 5/2017 | Szeto | G06N 20/00 |
| 2017/0220943 | A1* | 8/2017 | Duncan | G06F 8/38 |
| 2017/0286502 | A1* | 10/2017 | Bar-Or | G06F 16/2423 |
| 2018/0137424 | A1* | 5/2018 | Gabaldon Royval | G06N 5/022 |
| 2019/0095507 | A1* | 3/2019 | Elisseeff | G06N 3/006 |
| 2019/0213303 | A1* | 7/2019 | Han | G06N 20/00 |
| 2020/0034357 | A1* | 1/2020 | Panuganty | G06F 16/248 |
| 2020/0099688 | A1* | 3/2020 | Anders | G06N 20/00 |

OTHER PUBLICATIONS

Das, Manirupa, Renhao Cui, David R. Campbell, Gagan Agrawal, and Rajiv Ramnath. "Towards methods for systematic research on big data." In 2015 IEEE International Conference on Big Data (Big Data), pp. 2072-2081. IEEE, 2015. (Year: 2015).*

Bohlouli, Mahdi, Jens Dalter, Mareike Dornhöfer, Johannes Zenkert, and Madjid Fathi. "Knowledge discovery from social media using big data-provided sentiment analysis (SoMABiT)." Journal of Information Science 41, No. 6 (2015): 779-798. (Year: 2015).*

Malensek, Matthew, Sangmi Pallickara, and Shrideep Pallickara. "Analytic queries over geospatial time-series data using distributed hash tables." IEEE Transactions on Knowledge and Data Engineering 28, No. 6 (2016): 1408-1422. (Year: 2016).*

* cited by examiner

REAL-TIME PREDICTIVE KNOWLEDGE PATTERN MACHINE

CROSS REFERENCE

This application is a continuation-in-part of and claims priority to U.S. patent application Ser. No. 17/159,707, filed on Jan. 27, 2021, which is a continuation of and claims priority to U.S. patent application Ser. No. 17/090,625, filed on Nov. 5, 2020, the entireties of which are herein incorporated by reference.

TECHNICAL FIELD

This disclosure relates to data analytics in a real-time predictive knowledge pattern machine.

BACKGROUND

To answer predictive question, a researcher following a scientific method must proceed through numerous manual steps and experimentation before arriving to a conclusion with communicable results, from which analysis is then manually developed to obtain predictive insights.

BRIEF DESCRIPTION OF THE DRAWINGS

For a more complete understanding of this disclosure, reference is made to the following description and accompanying drawings.

DETAILED DESCRIPTION

Figure 1:
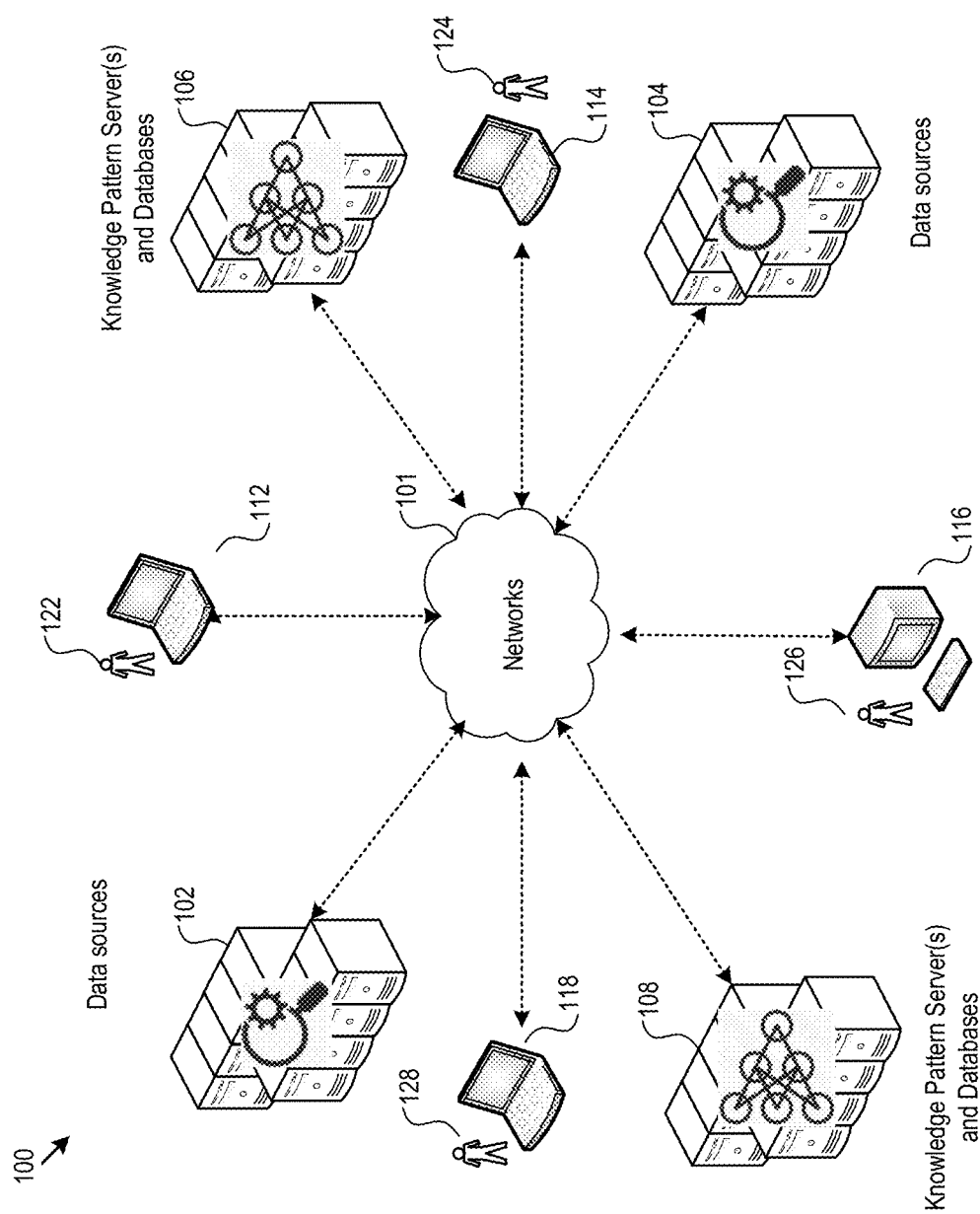
FIG. 1 illustrates an example computer network platform for implementing a real-time predictive knowledge pattern machine.

The following description and drawing set forth certain illustrative implementations of this disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

A traditional search engine serves as a simple data aggregator. In other words, the function of a traditional search engine is limited to search data sources for information items matching a set of keywords in various degrees. The search result is usually presented as a list of browsable data items that faithfully duplicate the information contained in their sources. Some sophisticated search engines may maintain up-to-date indexes of information items in the data sources to speed up searches. Nevertheless, such traditional search engine may not be capable of recognizing knowledge patterns in user queries and performing intelligent and predictive data analytics. Furthermore, while such a search engine may keep track of a search history for a particular user, it may not be configured to intelligently consider prior searches in performing a new search. In other words, new searches may not utilize knowledge gained in prior searches, i.e., a traditional search engine may be stateless.

The disclosure below describes a knowledge pattern machine that goes beyond a traditional search engine as simple information aggregator. Rather than acting as a search engine of the data itself, the knowledge pattern machine analyzes the input query with or without supplemental information supplied from a user either voluntarily or interactively to discover correlations within the queries, the supplemental information, and historical data, to derive data patterns based on user queries for predictively generating new knowledge items that are of interest to the user, and to automatically generate a report as an answer to the user query. The format of the report is intelligently determined, and the report is automatically and constantly updated while new queries are being ingested and as various datasets change over time. Previous patterns and knowledge items are accumulated and incorporated in identification of new data patterns and new predictive knowledge items in response to future user queries, thus providing a stateful machine. The data patterns and knowledge items and other datasets are dynamically organized hierarchically and may be shared among different users at various levels and are also automatically updated under various triggering conditions.

As described in more detail below, the knowledge pattern machine integrates various levels of artificial intelligence to provide predictive data analytics that significantly reduce the amount of manual user research with respect to queries that do not correspond to a direct answer from the available data sources. The pattern machine intelligently and automatically conducts predictive data analytics to generate qualitative and or quantitative answers and trends based on user queries.

FIG. 1 shows an example network system 100 for implementing a knowledge pattern machine. System 100 includes one or more knowledge pattern servers and databases 106 and 108, and data sources 102 and 104. The knowledge pattern servers and databases 106 and 106 may be accessed by individual or a group of users 122, 124, 126, and 126 via their computing devices 112, 114, 116, and 118. The computing devices 112-118, knowledge pattern servers and databases 106 and 108 and data sources 102 and 104 may be connected via public or private communication networks 101. The knowledge pattern servers and databases 106 and 108 and data sources 102 and 104 may be centralized or may alternatively be distributed across various geographic regions. The knowledge pattern servers and databases 106 and 108 and data sources 102 and 104 may be implemented as dedicated computers. Alternatively, the knowledge pattern servers and databases 106 and 108 and data sources 102 and 104 may be implemented as virtual machines in, for example, a cloud computing environment. The computing devices 112-118 may be implemented as any electronic devices capable of accessing the knowledge pattern servers and databases 106 and 108 and data sources 102 and 104 via the communication network 101. The access may be provided by means of webpages accessible in web browsers running on the computing devices 112-118 or may be provided alternatively via dedicated client application programs running on the computing devices 112-118. Such access may be associated with a user account and may be permissioned via user password protection.

Figure 2:
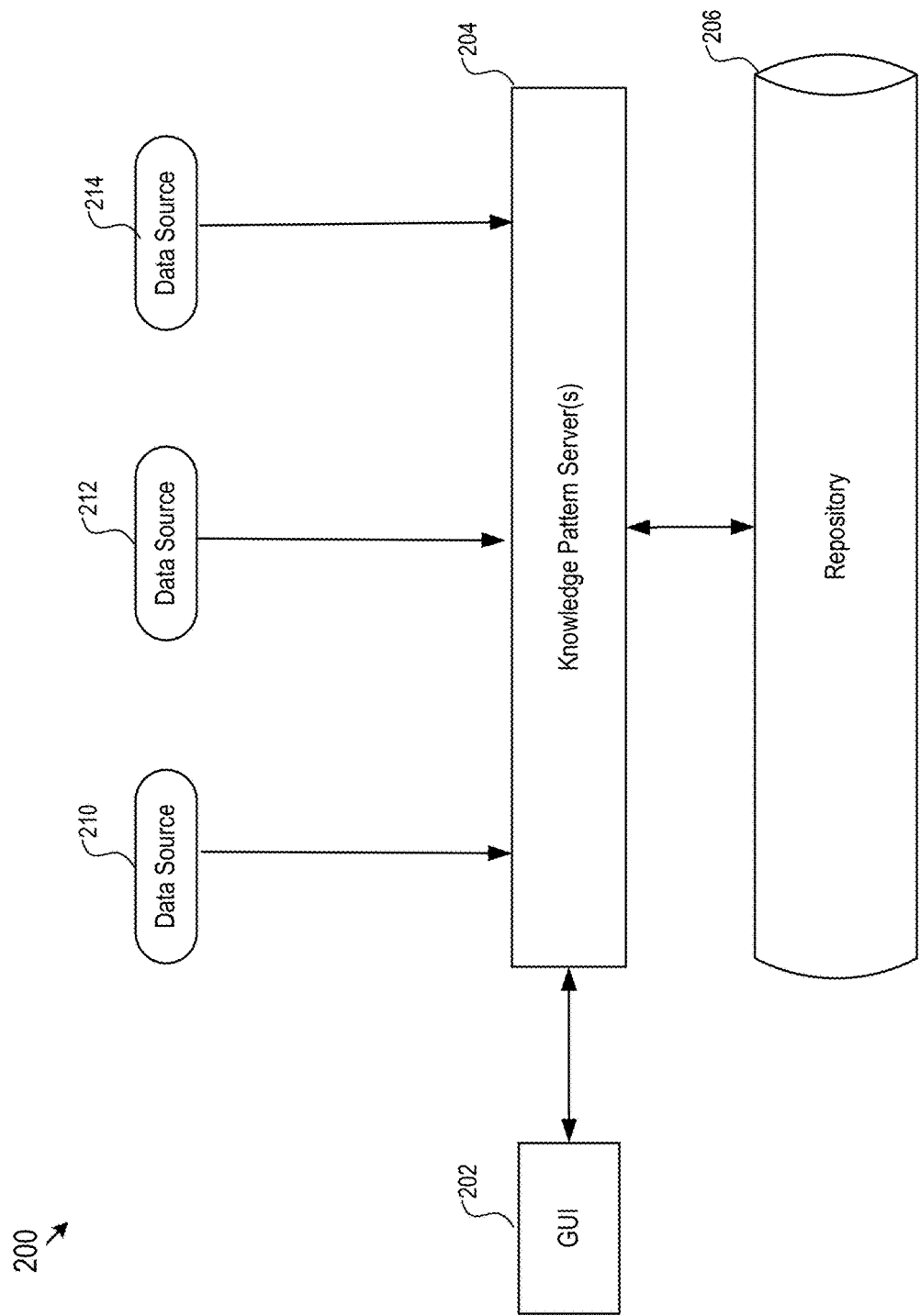
FIG. 2 illustrates an example block diagram of a real-time intelligent predictive knowledge pattern recognition machine.

FIG. 2 further illustrates example connectivity 200 between various subsystems of the knowledge pattern machine system of FIG. 1. Specifically, the knowledge pattern servers 106/108 may include a set servers 204 in communication with repository 206, which, as described in more detail below, hold various knowledge items (variables), knowledge patterns, input queries (or user queries), and reports. The knowledge pattern servers 204 may further communicate with each of the user computing devices 112-118 of FIG. 1 via a Graphical User Interface (GUI) 202 for receiving user queries and interactive commands, and for sending various knowledge patterns, input query options, and final report. The knowledge pattern servers 204 may further communicate with data sources 210, 212, and 214 for performing data mining and pattern detection of disparate data items from the data sources. The data mining, for example, may be implemented as normal keyword based queries. The knowledge pattern servers 204 may maintain one or more up-to-date indexes of information items in the data sources 210-214 to speed up the data mining process by the knowledge pattern servers 204.

Figure 3:
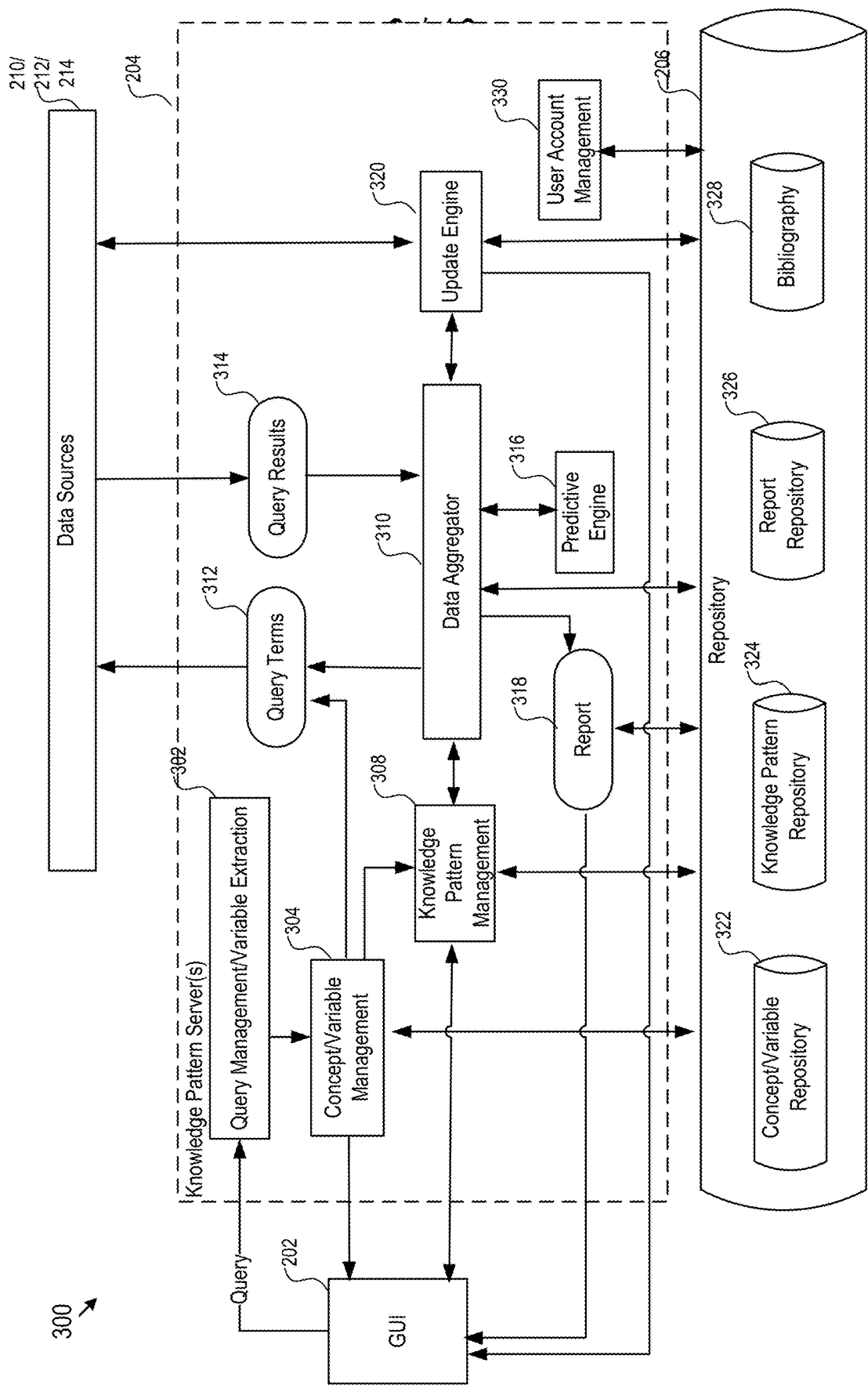
FIG. 3 illustrates various functional components of an example real-time intelligent predictive knowledge pattern recognition machine.

FIG. 3 illustrates example functional blocks of the knowledge pattern servers 204 and the repository 206 of FIG. 2 in further detail. FIG. 3 is described below in reference to FIGS. 4-6, in which various example user interfaces on the GUI 202 are shown for various operation stages of the knowledge pattern machine.

As shown in FIG. 3, the knowledge pattern servers 204 may include a query management/variable extraction engine 302. The query management/variable extraction engine 302 may receive queries from the user via the GUI 202 and perform intelligent analytics of the queries. The user queries may be alternatively referred to as user inquiries. The user queries may be input by the user in free form text, as shown by the example user query input interface as shown in 402 of FIG. 4, in which an input text box 406 may be provided for user input and a button 408 may be provided for receiving a user command to proceed with the query. As such, the query management/variable extraction engine 302 of FIG. 3 may include, for example, natural language processing components for intelligently extracting information from an input query. In some implementations, the query management/variable extraction engine 302 may convert the input query into a multi-dimensional vector in an embedding space or any type of multi-dimensional vector space using one or more models trained using various machine learning techniques. Such models may be trained using a pre-labeled training dataset. Distances between multi-dimensional vectors in the embedding space may be used to quantify similarity among the multi-dimensional vectors.

The query management/variable extraction engine 302 may further be pre-trained to divide the embedding space into compartments. Each of the compartments may correspond to a cluster of concepts (alternatively referred to as knowledge items, or variables). The query management/variable extraction engine 302 thus may be capable of determining a concept embedded in an input query by mapping the input query to a point within a particular cluster compartment in the embedding space. Points within a cluster may represent knowledge items that are conceptually alike. The cluster compartments may be used as a basis to categorize the user queries into different algorithmically dynamic classes. The different classes may be organized into a hierarchical structure including various levels of classes and sub-classes. The query management/variable extraction engine may be dynamically modified, adjusted, and/or retrained as the knowledge pattern machine is being expanded or updated. Consequently, the hierarchical category structure may be dynamically adjusted or modified. Further, each of the concepts may be categorized into different classes.

In some implementations, such categorization into different classes may be dynamic. In other words, the various classes that a concept can be categorized into may be dynamically adjusted as the underlying model evolves and as the knowledge pattern machine expands. Such dynamic adjustment may be implemented by associating or assigning functional codes with each of the query and other data or datasets. Such functional codes may be automatically assigned or constructed using AI models and may be provided in the form of executable machine code, interpretable scripts, dynamically linked codes or any other computer codes that may be executed with or without compilation. These functional codes may be automatically triggered and executed to perform dynamic categorization of the query and automatically update such categorization. This process may be referred to as an intelligent dynamic categorization model. In some implementations, the dynamic categorization may include algorithms that assign functional code to a data item as a format of typology that allows the data to possess a fixed categorical position only for as long as it is not updated. When the data item is updated, the functional code may reassign a new relevant categorical position for the data item to maintain an accuracy in temporal relevancy.

Alternatively, the input query may be parsed into multiple segments and each segment may be mapped to its own cluster in the embedding space. As such, multiple concepts may be extracted from an input query. In some other implementations, the query management/variable extraction engine 302 may be trained to convert an input query to multiple concepts by directly mapping the query to multiple points in different clusters in the embedding space with mapping probabilities. As such, the multiple concepts extracted from the input query by the query management/variable extraction engine 302 may be ranked and prioritized.

The concepts or variables generated by the query management/variable extraction engine 302 may be further processed by a concept/variable management engine 304. The concept/variable management engine 304 may be responsible for identifying correlation between the concepts/variables and further responsible for organizing the various concepts/variables into a relational, graphical, or other structures. For example, the concept/variable management engine 304 may organize the various concepts/variables into a knowledge graph comprising nodes and edges, where the nodes represent the various concepts/variables and the edges represent the relationship therebetween. Such a knowledge graph may be stored in the repository 206 as a concept/variable repository 322.

In some implementations, the organization, classification or categorization of the extracted concepts may be hierarchical. The organization, classification or categorization may be dynamic. Such dynamic classification or categorization may be implemented using the intelligent dynamic categorization model described above, e.g., by associating or assigning functional codes with each of the concept, knowledge items, and other data or datasets. Such functional codes, again, may be automatically assigned using AI models and may be provided in the form of executable machine code, interpretable scripts, dynamically linked codes or any other computer codes that may be executed with or without compilation. These functional codes may be automatically triggered and executed to perform dynamic categorization of the concepts, data, datasets, or other knowledge items and automatically update such categorization. In some implementations, the dynamic categorization may include algorithms that assign functional code to a data item as a format of typology that allows the data to possess a fixed categorical position only for as long as it is not updated. When the data item is updated, the functional code may reassign a new relevant categorical position for the data item to maintain an accuracy in temporal relevancy.

The organized concepts/variables may be expanded as new queries are analyzed. The relationship between the various concepts and variables may be identified using machine learning techniques. Such relationship may be learned further based on external data sources. As such, the relationship between the concepts/variables may be updated as the external data evolve over time. For example, the relationship (and thus the concept/variable repository 322) may be update periodically, or on any scheduled time.

In some implementations, the concept/variable management engine 304 may process the extracted concepts/variables from the query management/variable extraction engine 302 for a particular user input query, according to the concept/variable organizational structures, into an organized and prioritized concepts/variable list relevant to the user query, and send the list to the GUI 202 of the user computer device for display as a first response to the user query. An example list of relevant concepts and variables that may be displayed in the GUI is illustrated in 420 of FIG. 4. The list 420 may be shown along with the user input interface 402 of FIG. 4, e.g., as the user input is being entered or after the user activate the command 408. Alternatively, the list 420 may be shown in a separate user interface subsequent to the user query input interface 402 and after the command 408 is activated by the user.

Figure 4:
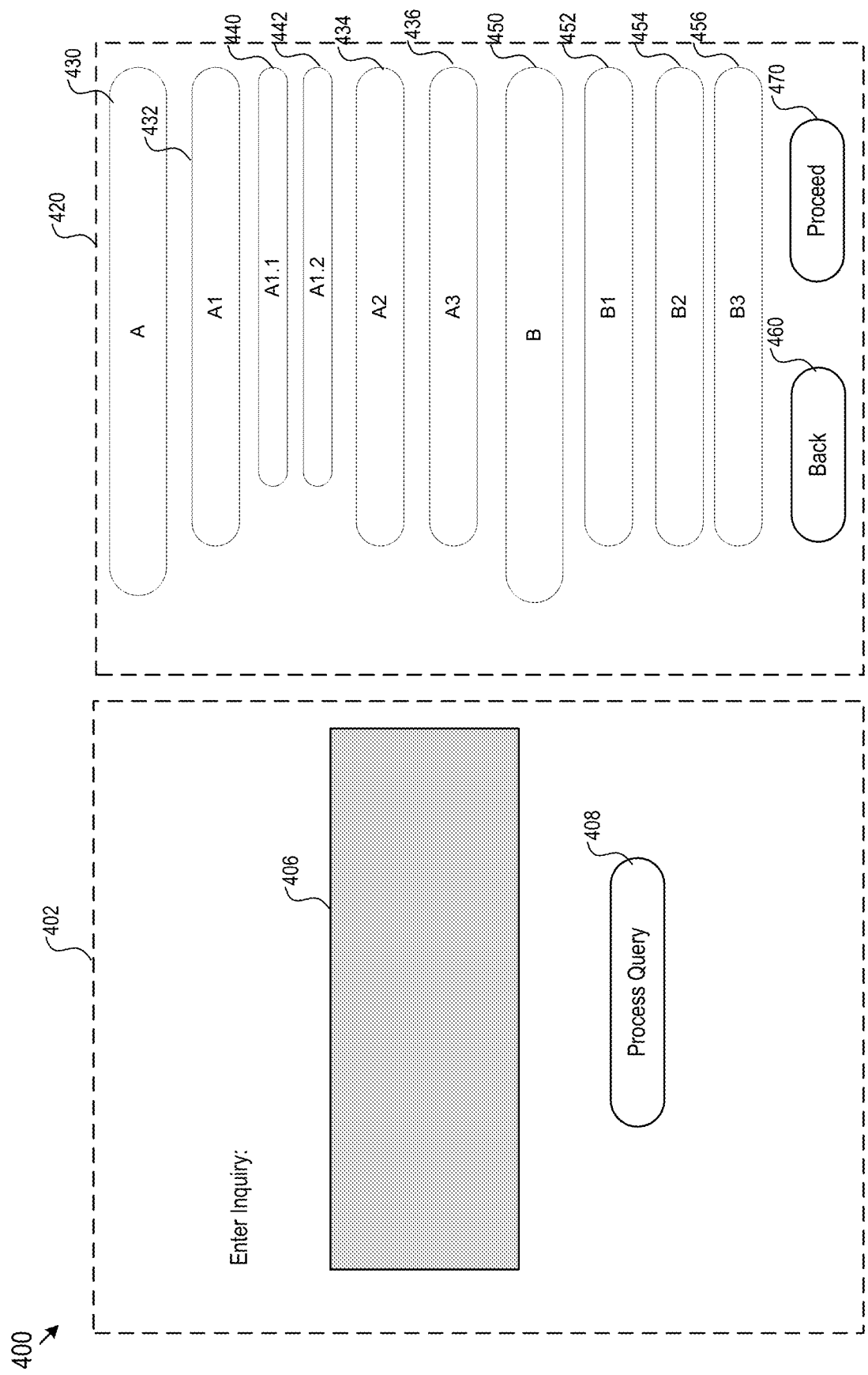
FIG. 4 shows an example user query interface of a real-time intelligent predictive knowledge pattern recognition machine.

The list, as shown in 420 of FIG. 4 as an example, may include a hierarchically organized concepts and variables. Such hierarchical relationship between the listed concepts/variables may be graphically indicated, as shown in 420 of FIG. 4. The list may be shown in order of relevance. For example, the concepts/variables shown on the top of the list 420 may be more relevant to the user query than the concepts/variables shown on the bottom of the list as determined by the concept/variable management engine 304. The hierarchical concept/variable list may include top level concepts/variables such as 430 (A), and 450 (B), second level concept/variables such as 432 (A1), 434 (A2), 436 (A3), 452 (B1), 454 (B2), 456 (B3), and third level concept/variables such as 440 (A1.1), 442 (A1.2).

In some implementations, the hierarchical concept/variable list 420 may only include variables direct extracted from a particular query and may be generated according to the concept/variable organizational structure. Alternatively, the hierarchical concept/variable list 420 with respect to the particular query may be expanded to add other relevant concepts/variables based on recorded and/or machine-learned current trends according to the external data used to train the concept/variable management engine 304.

Optionally, the various concepts and variables in the hierarchical concept/variable list 420 as shown in the GUI 202 may be individually selectable by the user. Specifically, the user may select or highlight the concepts and variables that are of particular of interest to the user for further knowledge pattern analysis. Once the concepts and variables that are of interest to the user are selected via the GUI 202, the user may proceed to activate the "proceed" button 470 for further knowledge pattern processing. Otherwise, the user may choose to navigate back to the query input interface 402 for modifying the query or starting over.

Returning to FIG. 3, the entire concept/variable list 420 of FIG. 4 or the set of concepts/variables as selected by the user may be communicated from the concept/variable management engine 304 to a knowledge pattern management engine 308. The knowledge pattern management engine 308 may intelligently analyze and identify correlations among these concepts and variables and recognize/generate one or more knowledge patterns. In some implementations, the knowledge patterns my further include one or more new concepts or variables identified by the knowledge pattern management engine 308 as suitable for providing various aspects that facilitate the user in ascertaining answers to the query.

Figure 5:
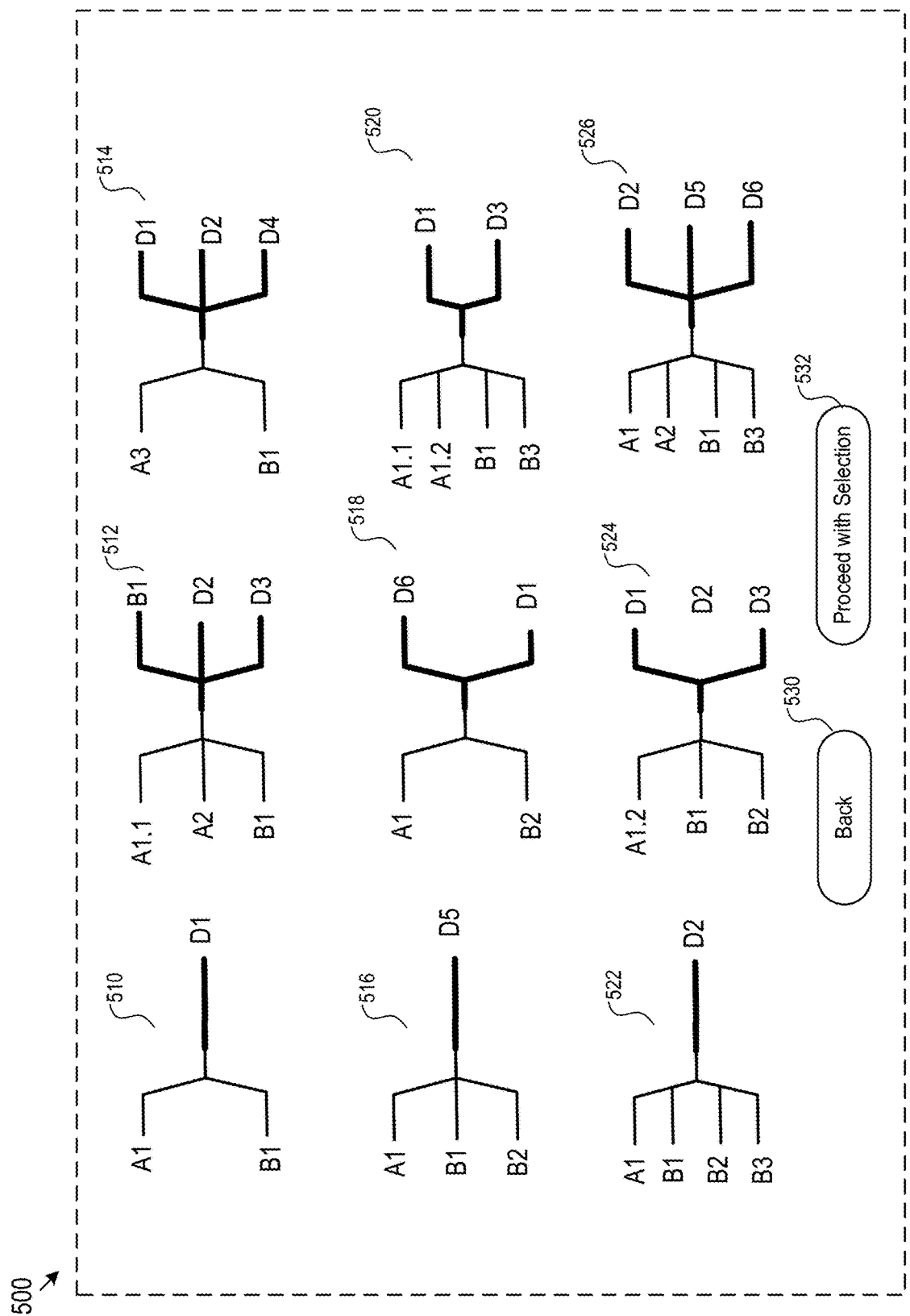
FIG. 5 shows an example user knowledge pattern selection interface of a real-time intelligent predictive knowledge pattern recognition machine.

FIG. 5 illustrates example knowledge patterns 500 generated by the knowledge pattern management engine 308. In the non-limiting example of FIG. 5, each individual knowledge pattern are shown visually as a double-sided tree structure. The tree structure on the left side of each of the knowledge patterns represents the concepts/variables associated with the input query that are considered as correlated by the knowledge pattern management engine 308. The tree structure on the right side of each of the knowledge pattern represents new concepts/variables that are related to the input variable considered by the knowledge pattern management engine 308 as likely subject matters contributing to answers to the user inquiry. The visualization in 500 of FIG. 5 may be further representative of what the knowledge pattern management engine 308 feeds back to the GUI 202 of FIG. 3 for viewing by the user. In other words, from the user standpoint, the GUI transitions from the interface 420 of FIGS. 4 to 500 of FIG. 5 after the user activates the "Proceed" command 470 of FIG. 4. These knowledge patterns generated by the knowledge pattern management engine 308 may be ranked, e.g., with the most relevant patterns (as identified by the knowledge pattern management engine 308 of FIG. 3) listed at the front.

The knowledge patterns 510-526 shown in FIG. 5 illustrate various example combination of concepts/variables associated with the input query that are correlated as identified by the knowledge pattern management engine 308 of FIG. 3. Such correlations may be expanded to one or more other concepts or variables. For example, as shown in 510, the knowledge pattern management engine 308 identifies that two of the second level concepts/variables A1 and B1 of 420 of FIG. 4 are correlated via concept/variable D1 not included within the concepts/variables of 420 of FIG. 4 (which are identified by the concept/variable management engine 304 as associated with the input query). Likewise, the knowledge pattern management engine 308 may further identify that different set of two concepts/variables of 420 of FIG. 4 may be correlated via two other variables (as shown by 518), and via three other variables (as shown in 514). Similarly, the knowledge pattern management engine 308 may further identify that different set of three concepts/variables of 420 of FIG. 4 may be correlated via a single other variable (as shown in 516), via two other variables (as shown by 524), and via three other variables (as shown in 512); and that different set of four concepts/variables of 420 of FIG. 4 may be correlated via a single other variable (as shown in 522), via two other variables (as shown by 520), and via three other variables (as shown in 526). The concepts/variables represented by "D" in FIG. 5 may be different from those associated with the input query (the "A" and "B"). Those having ordinary skill in the art understand that the concepts/variables associated with the input query may nevertheless appear on the right side of the knowledge patterns in FIG. 5. For example, the knowledge pattern 512 of FIG. 5 shows that the concept A1.1, A2 and B1 are correlated via concept/variable B1, D2 and D3, where B1 is among the list 420 of FIG. 4. The various knowledge patterns shown in FIG. 5 are merely examples. Any other correlations among the various concepts and variables may be identified by the knowledge pattern management engine 308. Such correlations and knowledge patterns may be graphically illustrated in other forms unlimited to the particular example shown in FIG. 5. Further, the knowledge patterns identified by the knowledge pattern management engine 308 may be further stored in the repository 206 of FIG. 3 as a knowledge pattern repository 324.

The knowledge patterns generated by the knowledge pattern management engine 308 as shown in FIG. 5 provide a collection detected or recognized correlation of topics or concepts/variables. As shown in FIG. 5, the user may be allowed to select the particular one or more knowledge patterns that fit her or his actual interest. The selected knowledge patterns are then used for further performing aggregation and predictive data analytics of disparate data items form the data sources, as described in more detail below. The user selection, representing her/his interest, may be further recorded in the repository 206 of FIG. 3.

The identification of the knowledge patterns as shown in FIG. 5 by the knowledge pattern management engine 308 may be based on various pre-trained machine-learning models. In addition or alternatively, the knowledge pattern management engine 308 may derive the knowledge patterns for a query further based on prior knowledge patterns stored in the knowledge pattern repository 324 of FIG. 3. In some implementations, the knowledge pattern management engine 308 may derive the knowledge patterns for a query further based on prior user selected knowledge patterns as recorded in the repository 206 of FIG. 3.

For example, the knowledge pattern management engine 308 may compare a new query and the concepts/variables thereof with historical queries and derive the knowledge patterns for the new query based on a similarity and or difference according to the comparison. The knowledge pattern management engine 308 may further organize the historical queries and knowledge patterns according to their differences and similarities. For example, one query or knowledge pattern may be an expanded version of another query or knowledge pattern. As such, the queries and the knowledge patterns may be hierarchically organized. The organized knowledge patterns in the repository 206 may then be relied on by the knowledge pattern management engine 208 to generate a set of knowledge patterns for a new input query for user selection. In addition, the organized knowledge patterns in the repository 206 may also be used to assist the concept/variable management engine 304 in developing the variable/concept list 420 of FIG. 4 for a particular input query.

The recognition and generation of the knowledge pattern by the knowledge pattern management engine 308 may be further base on correlation among data received from the data sources 210, 212, and 214 (the data mining process are further described in more detail below). For example, the knowledge pattern management engine 308 may intelligently identify correlations between the data items or query results returned from the data sources using, e.g., machine learning techniques. The knowledge patterns are recognized from such correlations and graphically shown as the various example patterns in FIG. 5. The correlations may be ordered according to their strength. Correlations higher than a predetermined threshold may be included and reflected in the graphical patterns of FIG. 5.

Returning to FIG. 3, the concept/variable management engine 304 may generate query terms 312 and send the query terms to the data sources 210-214 to generate query results 314, which may be provided to a data aggregator 310. As described above, in some implementations, the data aggregator 310 and the knowledge pattern management engine 308 may recognize correlations in the query results and generate the knowledge patterns of FIG. 5. In some other implementation, the knowledge patterns may be generated in other manners by the knowledge pattern management engine 308 (as described above) and the user selected knowledge patterns and/or the concepts/variables may be used for generating the query terms 312. The query terms may be sent to the data sources 210-214 to obtain query results 314. The data mining of the data sources 210-214 using the query terms 312 may be based on any types of data mining technologies. A correspondence between the query terms and the concepts/variables of the user selected knowledge patterns may be tracked by the data aggregator 310. As such, correspondence between the data returned by the data sources 210-214 and the concepts/variables in the knowledge pattern may be identified.

The query results 314 may then be processed by the data aggregator 310 according to the knowledge patterns to generate report 318. Optionally, the data aggregator 310 may also retrieve previously generated reports stored in the report repository 326 for its data analytics. The report generated by the data aggregator may be predictive in nature. In other words, the report 318 may contain information that does not directly exist in the data sources 210-214 and thus could not be part of the query results 314. Specifically, the data aggregator may rely on an internal or external predictive engine 316 to generate predictions based on the query results 314 and according to the user selected knowledge patterns. The predictive engine 316 may include various prediction modules including but not limited to various regression algorithms, various types of neural networks, and the like. The prediction may be qualitative or quantitative. For example, the prediction may be directed to some general trends. For another example, the predictions may include numerical values for a particular variable of the user selected knowledge patterns.

Figure 6:
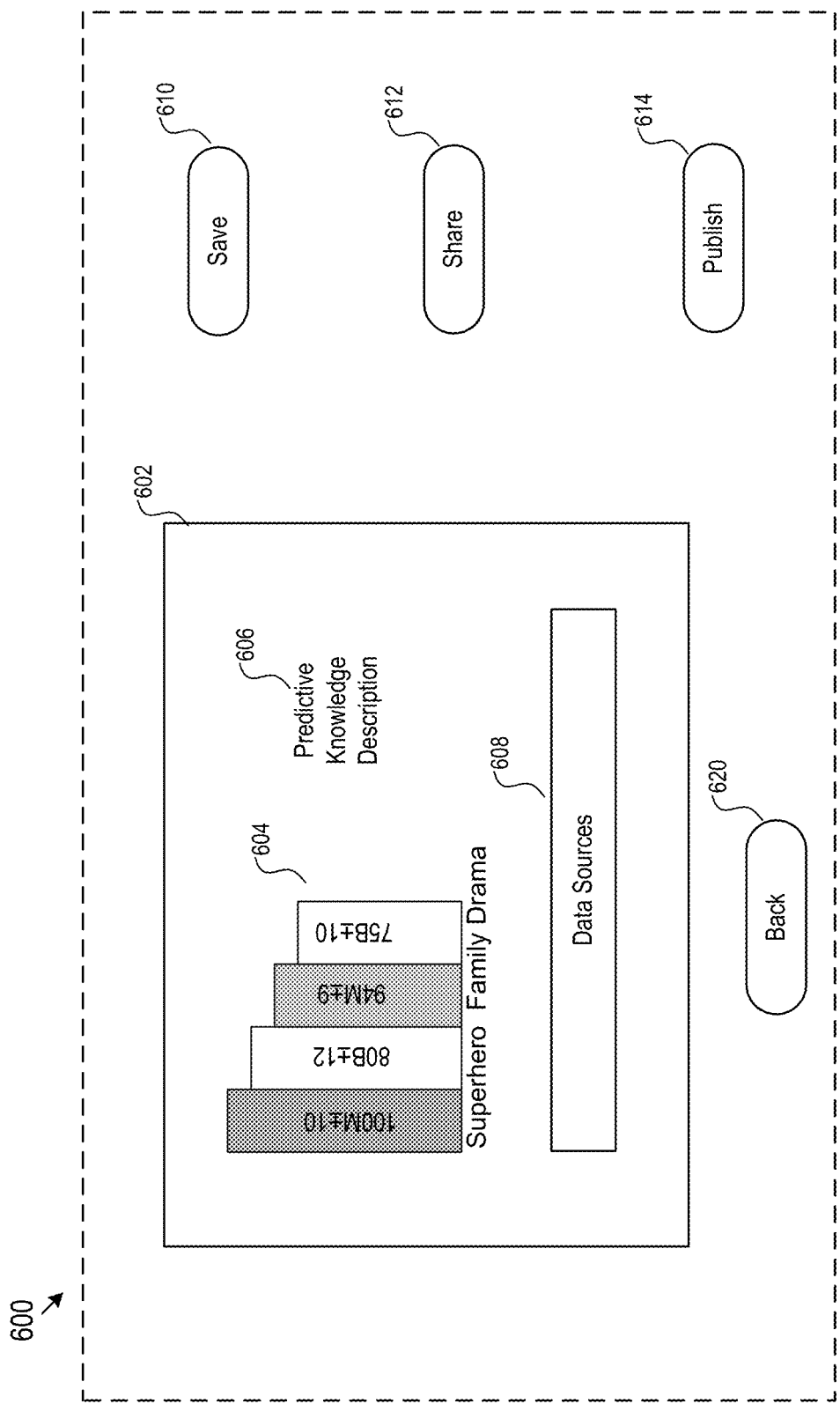
FIG. 6 shows an example report interface of a real-time intelligent prediction according to a knowledge pattern.

The report 318 automatically generated by the data aggregator 310 may be stored in the repository 206 as the report repository 326. The report 318 is further provided by the knowledge pattern servers 204 to the user GUI 202. The report may be displayed graphically in the GUI 202 for user viewing, as shown in the example of FIG. 6. FIG. 6 shows that the report may be visually displayed as panel 602 of a GUI interface 600. As an example, the panel 602 may include various descriptions 606 and graphics 604. In some implementations, the graphics 604 may include various two dimensional or three dimensional line graphs, bar graphs, scatter plots, pie charts, mosaic/Mekko charts, Gannt charts, waterfall charts, spider charts, contour plots, heat maps, and the like. While a single graph is illustrated in FIG. 6, the number of graphics is not so limited and is determined by the number knowledge patterns and numerical correlation between the concepts and variables in the knowledge patterns. These graphics may indicate numerical relationship between the various concepts/variables in the user selected knowledge patterns. Some of the data in these graphics may comprise predictive and/or futuristic values. These predictive/futuristic values may provide critical information for answering the user query.

In some implementations, the visual format of the report in the panel 602 may be chosen by the user. As such, an additional user interface in the GUI 202 may be provided for format selection. Various options may be provided to the user for selection based on the nature of the query, whether the analytics is numerical, and the number of variables involved in the report. The options may include choice between graphical and textual representations, type of graphics, layout of the presentation, and the like. The options of visual format presented by pattern machine for the user to choose may be intelligently determined by the pattern machine according to the types, nature, and number of the concepts/variables. The user may be allowed to choose more than one options. The visual representation of the report may then be generated by the data aggregator 310 accordingly.

Because some of the data values in the graphics 604 are predictive, error estimation for these data values may also be shown in the graphics 604. Details with respect to error estimation in the report and margin of error in general are further given below. Such error estimation may be generated by the data aggregator 310 and the predictive engine 316 of FIG. 3 when performing the predictive data analytics. For example, the errors may be numerically estimated when a regression algorithms is used to make a prediction. For another example, a neural network for predicting values for a particular variable may be associated with a prediction probability. Such prediction probability may be used for estimating the prediction error. The prediction error, for example, may be shown as error bars in the graphics 604 of FIG. 6. Alternatively, a separate error estimation graph for all predictions may be shown in the panel 602.

The displayed information panel 602 may also indicate data sources used by the data aggregator 310 for performing data analytics and for generating the graphics 604 or description 606, as shown by 608 in FIG. 6. The data sources may be listed in 608 as a bibliography. If a data source is viewable or downloadable by the user, a link (via a web browser, for example) may be included in the data source list 608. The information related to the data sources may be further stored in the repository 206 of FIG. 3 as the bibliography repository 328. In some alternative implementations, bibliography of data sources used for a particular prediction may be shown, accessed, and viewed in separate user interfaces.

The GUI interface 600 of FIG. 6 may further include other GUI navigation controls such as the "Back" button 620. The user may activate the button 620 to return a previous GUI interface, such as the knowledge pattern display and selection interface 500 of FIG. 5. Other navigation controls may also be included for the user to directly navigate to any other GUI interfaces described above. The GUI interface 600 may further include command button 610 that may be activated by the user for saving the reports and data sources to the report repository 326 and bibliography repository 328 of FIG. 3.

Returning to FIG. 3, the knowledge pattern servers may also implement an update engine 320 for updating the reports for the user queries and knowledge patterns recorded in the repository 206. The updated reports may be further stored in the repository 206. In some implementations, the update engine 320 may monitor changes in data sources associated with the various reports in the repository 206. The changes may then trigger the update engine 320 to regenerate these reports by invoking the data aggregator 310 and the predictive engine 316 to rerun the predictive data analytics. In some other implementations, the update engine 320 may invoke the data aggregator 310 and the predictive engine 316 to generate updated reports periodically or according to a predetermined schedule and store the updated reports in the repository 206. As such, the report associated with the various knowledge patterns as stored in the repository 206 may be kept up-to-date in real-time, periodically, or at any predefined times. The user may be notified of any updates of any particular knowledge pattern via the GUI 202 and determine whether to view an updated report generated for previous queries.

The knowledge pattern servers 204 of FIG. 3 are described above with respect to a particular user of the knowledge pattern machine. In some implementations, the knowledge pattern servers 204 and the GUI 202 may be configured to provide the functions above to a plurality of users as a knowledge pattern service. As such, the knowledge pattern servers 204 my further include a user account management engine 330 of FIG. 3. The user account management engine 330 maintains and secures separate accounts for each user subscribed to the knowledge pattern service. The concepts/variables, the knowledge patterns, the reports, and the data source bibliographies may correspondingly be managed and maintained according to user accounts. In other words, each user may be associated with his/her own service space of queries, variables, concepts, knowledge patterns, and reports, as a predictive personal knowledge base that expands over time as more queries are processed for the user by the knowledge pattern servers 204.

In some other implementations, knowledge patterns and/or reports maintained for a particular user may be shared to one or more other users or a group of users, and may be published for use by all other users. As such, the user account management engine of 330 may be configured to link the user account spaces for sharing or publishing of user-specific knowledge patterns. Shared knowledge patterns do not need to be duplicated in the repository 206. Instead, shared knowledge pattern stored in the repository 206 may be associated with access permissions given to one or more user accounts.

Accordingly, as shown in the report interface 600 of FIG. 6, a particular user may decide to share or publish a particular data pattern and report by activating a "Share" command button 612 or "Publish" command button 614. As a result of such sharing or publishing action, the particular knowledge pattern and report may become part of other user's collection of knowledge patterns and reports, which may then become part of the basis for the knowledge pattern management engine 308 and data aggregator 310 for processing future queries from those users.

In some implementations, the knowledge pattern servers 204 may further provide one or more user interfaces via the GUI 202 for user to navigate and view previously queries, knowledge patterns, and reports. As described above, these queries, knowledge patterns, and reports may be hierarchically organized and displayed in the GUI 202 to facilitate user navigation and selection.

Figure 7:
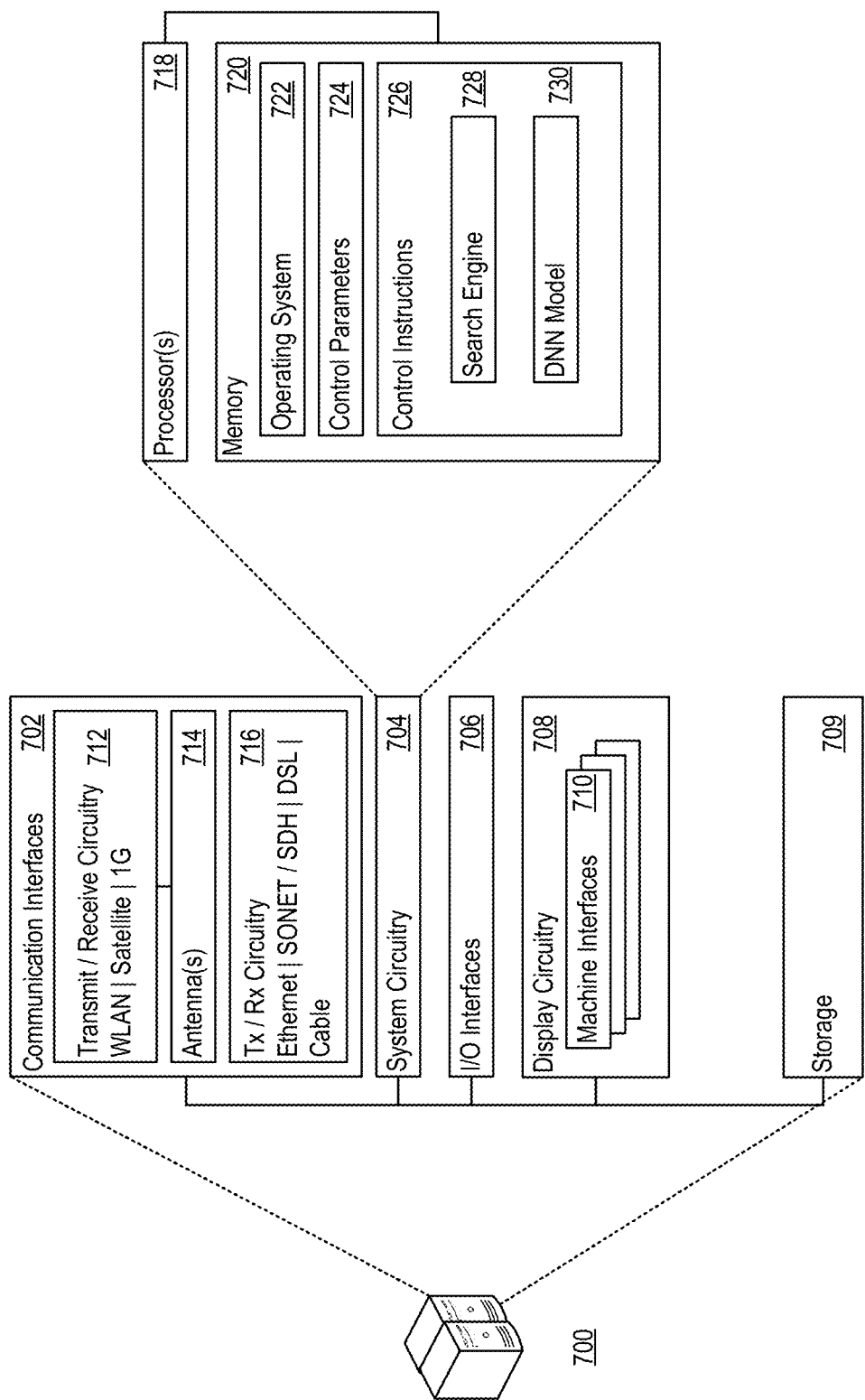
FIG. 7 shows an example computer device that may be implemented in various components of the real-time intelligent predictive knowledge pattern recognition machine of FIGS. 2-3.

Finally, in FIG. 7, the knowledge pattern servers and databases 106 and 108 and data sources 102 and 104 of FIG. 1 are shown as including a group of centralized or distributed dedicated or virtual computers. Each of these computers as well as the user computing devices 112-118 of FIG. 1 may be implemented as shown in 700 of FIG. 7, including communication interfaces 702, system circuitry 704, input/output (I/O) interfaces 706, storage 709, and display circuitry 708 that generates machine interfaces 710 (such as the user interfaces described above) locally or for remote display, e.g., in a web browser running on a local or remote machine. The machine interfaces 710 and the I/O interfaces 706 may include GUIs, touch sensitive displays, voice or facial recognition inputs, buttons, switches, speakers and other user interface elements. Additional examples of the I/O interfaces 706 include microphones, video and still image cameras, headset and microphone input/output jacks, Universal Serial Bus (USB) connectors, memory card slots, and other types of inputs. The I/O interfaces 706 may further include magnetic or optical media interfaces (e.g., a CDROM or DVD drive), serial and parallel bus interfaces, and keyboard and mouse interfaces.

The communication interfaces 702 may include wireless transmitters and receivers ("transceivers") 712 and any antennas 714 used by the transmitting and receiving circuitry of the transceivers 712. The transceivers 712 and antennas 714 may support Wi-Fi network communications, for instance, under any version of IEEE 802.11, e.g., 802.11n or 802.11ac. The communication interfaces 702 may also include wireline transceivers 716. The wireline transceivers 716 may provide physical layer interfaces for any of a wide range of communication protocols, such as any type of Ethernet, data over cable service interface specification (DOCSIS), digital subscriber line (DSL), Synchronous Optical Network (SONET), or other protocol. The computers 700 may communicate with on another via the communication interface 702 shown in FIG. 7 and the communication network 101 as shown in FIG. 1.

The storage 709 may be used to store various initial, intermediate, or final data or model for implementing the functionalities of the knowledge pattern machine and the various other computing components described above. The storage 709 may be centralized or distributed. For example, the storage 279 may be hosted remotely by a cloud computing service provider.

The system circuitry 704 may include hardware, software, firmware, or other circuitry in any combination. The system circuitry 704 may be implemented, for example, with one or more systems on a chip (SoC), application specific integrated circuits (ASIC), microprocessors, discrete analog and digital circuits, and other circuitry. The system circuitry 704 is part of the implementation of any desired functionality related to the knowledge pattern machine. As just one example, the system circuitry 704 may include one or more instruction processors 718 and memories 720. The memories 720 may store, for example, control instructions 724 and an operating system 722. In one implementation, the instruction processors 718 may execute the control instructions 724 and the operating system 722 to carry out any desired functionality related to the functionalities of the knowledge pattern machine described above.

An examples application of the intelligent knowledge pattern recognition machine above is further given below. In this example application scenario, a screenwriter may have several ideas spanning different genres for her next screenplay writing project. But she does not know which idea to commit to writing. She would like to efficiently and effectively spend her time writing a screenplay that will give her the best chance of success in the upcoming year. In using the pattern machine for her predictive analytics in place of doing manual research, she may input into the pattern machine via, e.g., the user interface 400 of FIG. 4, a query or question which reads, for example, "what screenplays will be most successful next year?"

In some implementations, the user interface 400 may alternatively provide options for the user to voluntarily input supplemental information with the query, including but not limited to textual documents, spreadsheets, numerical data collections, graphical illustrations, and the like. These supplemental information may be entered by the user with highlights. Alternatively, the user interface 400 may be configured to allow the user to make a selection of whether the user desires to supply any supplemental information with the query and respond accordingly based on whether such an option is selected by the user. In some other implementations, the user interface 400 may be configured to receive user input of query and then determine by the various query analytics engines whether supplemental information from the user may be helpful, and if so, automatically prompt the user to interactively enter supplemental information if available, and optionally allow the user to highlight portions of the entered supplemental information.

The pattern machine, by using the intelligent concept/variable management engine 304 of FIG. 3, may process the input query with or without any supplemental information described above, and intelligently breaks down this input query, and optionally, the supplemental information with or without highlights, to generate, for example, the following categories and topics as output concepts/variables relating to screen play, their success, and timeline:

A. Movie Screenplay
  (a) Genre
  (b) Tone
  (c) Type of Protagonist
  (d) Length
B. TV Show Script
  (a) Genre
  (b) Tone
  (c) Type of Protagonist
  (d) Length
C. Immediate Success
  (a) Independent Interest
  (b) Studio Interest
  (c) Talent Agent Interest
D. Long-Term Success
  (a) Box Office
  (b) Awards
  (c) Social Media
  (d) Critical Reviews
  (e) Festivals
  (f) America
  (g) International In other words, the pattern machine identifies relevant main categories from the original input inquiry and identifies relevant subtopics by, for example, analyzing relevant data related to the main categories. As described above with respect to FIG. 4, some of the concepts or variables, such as "Movie Screenplay", "TV Script", "success", and time scales ("long term" v. "immediate") may be a direct extraction or explicit derivation from the input query via semantic analysis. Some of the other concepts may be derived from an aggregation, comparison, and intelligent analysis of the input query in conjunction with or in view of public domain data and other data that is stored in the system database and dynamically linked. Such derivation constitute an expansion of the input query into more related concepts and knowledge items as illustrated above.

Such query expansion may be derived from an aggregation, comparison, and intelligent analysis of the input query with public domain data and data that is stored in the system database and dynamically linked. Such expansion may be achieved via extraction of loose association and/or contextual interpretation of words, phrases, or linguistic combinations. Because some of the data associated with the linguistic or other semantic models may change over time, these linguistic or other semantic models used for such expansion may dynamically evolve and adjust. In other words, these models may include machine learning algorithms that adjust as new data are processed. The adjusted query processing models may be used for processing/expanding new queries and for updating analytics of previous queries when being triggered.

For example, concepts such as attributes of the "Movie Screenplay" and "TV Script", and various aspects for measuring success may be expanded/derived from the concept/variable repository 322 of FIG. 3 as related to the concepts of "Movie Screenplay", "TV Script", and "success". The main categories or subtopics could vary, depending upon the phrasing of the original input query and the consequently relevant data which pertains to the entertainment industry at the moment the screenwriter inputs her question. The pattern machine may rank these main categories and subtopics and may only supply the most relevant items or a predefined number of items. The hierarchical layers for the main categories and subtopics are not limited to the two levels illustrated in the example above. These main categories and subtopics may form the basis for the concept/variable lists of FIG. 4. The screen writer may review the list and determine whether she needs to tweak or rephrase her question. She may also supply additional questions for further narrowing the scope of the main categories and subtopics.

The input query may contain numerical values. The query management/variable extraction engine 302 of FIG. 3 may be configured to detect numerical values and intelligently associate these numerical values with other portions of the query and perform numerical analytics by choosing numerical algorithms based on the output of the linguistic model and other semantic modes described above.

Because some of the data associated with the linguistic or other semantic models, algorithms, and patterns described above may change over time, these linguistic or other semantic models used for such derivation may dynamically evolve and adjust. In other words, these models may include machine learning algorithms that adjust or automatically retrain as new data is processed. The adjusted query processing models may be used for processing new queries and for updating analytics of previous queries when being triggered, as described elsewhere in this disclosure. In some other implementations, the hierarchical categorization of these extracted concepts may be implemented by associating or assigning functional codes with each of the concept. Using the intelligent dynamic categorization model described above, such functional codes may be automatically assigned using AI models and may be provided in the form of executable machine code, interpretable scripts, dynamically linked codes or any other computer codes that may be executed with or without compilation. These functional codes may be further automatically triggered and executed to perform dynamic categorization of the concepts during updating process described above. In some implementations, the dynamic categorization may include algorithms that assign functional code to a data item as a format of typology that allows the data to possess a fixed categorical position only for as long as it is not updated. When the data item is updated, the functional code may reassign a new relevant categorical position for the data item to maintain an accuracy in temporal relevancy.

The screen writer may select and refine from the main categories and subtopics. For example, she may be only interested in writing a movie screen play rather than a TV show. Further, she may already have a talent agent but is interested in, for example, seeing what type of financial backers might be interested in investing in her screenplay, either independent filmmakers or studios. She may be also only interested in, for example, the American rather than the International industry. As such, she may select all categories except for "TV Show Script" and all subtopics except for "Talent Agent Interest" and "International" in the user interface 420 of FIG. 4, and activate the "Proceed" command.

Thereafter the pattern machine intelligently generates pattern diagrams illustrating correlations between the main categories and subtopics based on intelligently recognized correlations in the available relevant data associated with these main categories and subtopics. The pattern diagrams may be presented as shown via the example user interface 500 of FIG. 5. For example, the pattern machine may determine that "Tone" and "Type of Protagonist" subtopics directly relate to "Studio Interest" and "Independent Interest", but not correlated with "Long-Term Success". The pattern machine may further determine that "Genre" does directly correlate with "Long-Term Success". As such, the pattern machine may extract the main categories and subtopics that are correlated as determined by relevant data, and present the correlations between them as the various pattern diagrams shown in FIG. 5.

The screenwriter may then select one or more of the diagrams for further predictive data analytics. For example, she may select via the user interface 500 of FIG. 5 a pattern diagram representing "Long-Term Success" by "Movie Genre" and a pattern diagram representing correlation between "Awards" and "Screenplay Length." She may then proceed to with the predictive data analytics by activating button 532 of FIG. 5.

The Pattern machine may then perform data analytics using current data from various data sources to generate predictive correlation between these categories or subtopics. For visual presentation, the pattern machine may provide the screen writer interface for selection from a plurality of most relevant graphical formats. For example, a bar graph of "Long-Term Success by Movie Genre" might most effectively demonstrate that Superhero Movies are predicted to be the most successful in Box Office and Social Media in America next year. The screen writer may choose this format. In the bar graph, as illustrated as 604 in FIG. 6, for example, social media may be shown as grey bars representing "Number of Mentions Across All Platforms" and Box Office may be shown as white bars represented by "Amount in US Dollars." Genres would comprise the other axis, with each genre specific (for example, Dark Comedy, Family Drama, Superhero, Sitcom, etc.) associated with a Social Media bar and a Box Office Bar. Margin of error for the predictions may also be indicated. For example, the pattern machine may predict that the Superhero genre could have a lead over the Family Drama genre by 5 Billion USD in Box Office and 6 Million in Social Media Mentions next year in America with predicted margins of error. Textual information as shown in 606 of FIG. 6 may also be generated by the pattern machine. In this example, the textual information as a response to the inquiry of the screen writer may be "Superhero Movies will be the most successful movie genre in America next year with the predicted margin of error."

For the "Award" and "Screenplay Length" correlation identified by the pattern machine, the screen writer may choose a linear chart as a visual format for presenting the prediction by the pattern machine. As such, a linear chart may be generated and may show that the screenplays which are predicted to win the most awards in America next year will be around 70 pages long, with a predicted margin of error. For example, one axis of the linear graph may represent screenplay length as "Page Number", and the other axis may represent "Number of Awards" for the screenplays. A text representation may be further generated by the pattern machine. The text representation may be: "The most award-winning screenplays in America next year will be around 70 pages long, with a 7% margin of error."

The screenwriter may save her Pattern Machine report including the two example visual graphs above, each with descriptive legends, margins of error, and citation of data sources used in the predictive analytics. These stored predictive reports may be automatically updated as described above. With such automatic real-time updates, she may be able to access her "Screenplay Success" patterns later on to obtain up-to-date predictive report. By the following year, the patterns will remain predictive, and will have adjusted according to real-time data analysis. The screenwriter may further share her pattern report with others via the pattern machine, as described above. For example, she may share the pattern with her co-workers when writing a superhero screenplay.

Later, when the screenwriter revises her screenplay, she might return to the pattern machine for further predictive analysis. For example, she may want to submit her screenplay to a specific screenwriting contest. She could either edit the previously saved pattern report by returning to the original query and adding another entry to specify the specific "Award" she is trying to win. In this manner, she could measure her chances at winning the specific contest alongside the other factors of success (box office, social media, critical reviews, etc.) relying on the predictive analytics of the patter machine. Alternatively, she may generate a new report as described above.

Figure 8:
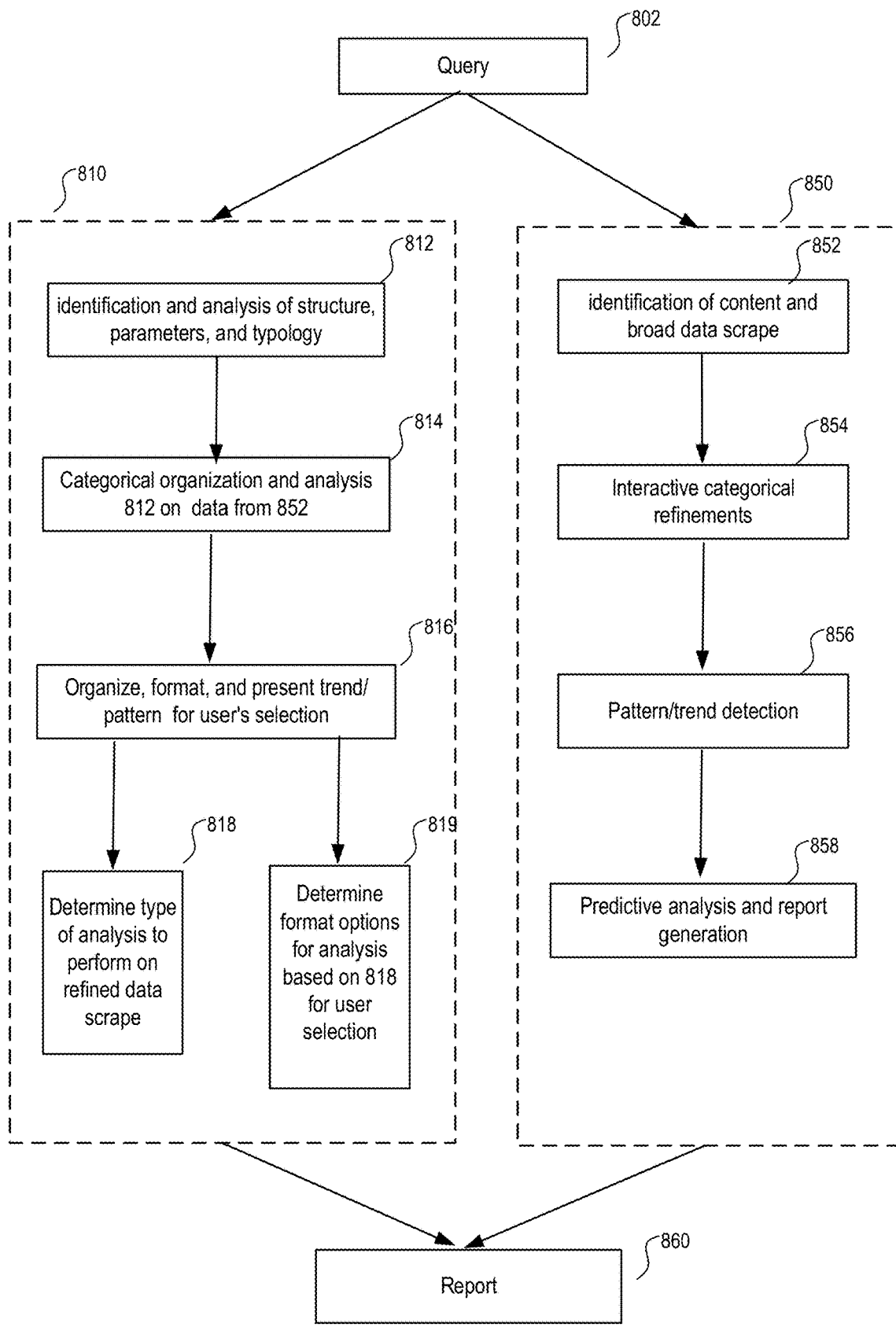
FIG. 8 illustrates an example query processing including two data analytics pipelines.

Returning to FIG. 3, the user input queries are processed by the GUI 202, the query management/variable extraction engine 302, the concept/variable management engine 304, the knowledge pattern management engine 308, and the data aggregator 310 interacting with the data sources 210-214, the data repository 206, and the prediction engine to generate prediction. In some implementations, these processing engines may be orchestrated to analyze the input query in multiple data analytics pipelines. For example, as shown in FIG. 8, the input query may be processed by these various engines in two interacting data analytics pipelines 802 and 804 to generate a final report 860.

The data analytics pipeline 810 may be configured to provide structural, categorical, and organizational processing of the input query, concept, knowledge items, and other datasets, whereas the data analytics pipeline 850 may be configured to process content of the query and data. The various steps in the two data analytics pipelines 810 and 850 are performed by the various query and data processing engines above and these steps interact within and between the data analytics pipelines 810 and 850. Solely for identification purposes, the data analytics pipeline 810 may be referred to as the "what" pipeline whereas the data analytics pipeline 850 may be referred to as the "why" pipeline.

For example, as shown by process 812, the "what" pipeline 810 may perform semantic identification of structural, parametric, and typological information from the input query 802. The information generated from process 812 may include, for example, the "what", "when", "who", and "where" extracted from the input query, indicating general categories, subject matters, and targets explicit or implicit in the input query. The process 812 may be performed to further identify the type of question (how, what, when, where, who) encoded in the query and derive a structure and format of the answer, which further aids an initial data scrape in the "why" pipeline 850. For example, the extracted information in step 812 may include words that indicate a timeline or time point ("when", e.g., "in 2030" or "by 2023"), geographic scope (e.g., "in America"), demographical scope (e.g., "federally" or "within predominantly Black communicates"), or any other information. For another example, the extracted information in step 812 may include topological information indicating one or more initial broad categories of the user query. The identification of the structural, parametric, and typological information in step 812 may be based on various semantic analytics described above with respect to FIG. 3 and may be performed, e.g., in a trained multi-dimensional vector space.

The processing step 852 of the "why" pipeline 850, for example, may perform identification of content more related to derivation of "why" component of the data analytics pertaining to the user query as categorically identified and refined in step 812 of the "what" pipeline 810 and perform broad data scrape that is not limited to but includes all data that is relevant to the "why" underlying the input query (e.g., why is the user asking this question and why is this query relevant). This step can be essential for deriving the concept and variables as managed by the corresponding engine 304 of FIG. 4 and for determining the scope of the broad data scrape from the external data source 210-214 and the data repository 206. For example, Fibonacci sequence may be used in conducting content-based data scrape. The Fibonacci sequence may also be used algorithmically to conduct content-based data scrapes as a formula for the constant expansion of content-based data. In some algorithmic implementations of the use of the Fibonacci sequence, the first variable in the sequence may represent the most essential data related to the content of an original input query.

In step 814 of the "what" pipeline 810, the data analytics pipeline 810 may perform categorical, sub-categorical, and organization of data gathered from the step 852 of the "why" pipeline 850 based on the initial topological, categorical, and structural information obtained from the step 812.

Step 854 of the "why" pipeline 850, for example, may perform relevant categorical refinements derived from the categorical analysis and data organization of step 814. For example, data categories may be refined interactively with the user. Categories of interest may be selected, removed, added, or replaced by user, as described above with respect to 420 of FIG. 4.

In step 856 of the "why" pipeline, various correlation among the refined data categories, concepts and variables may be detected to generate various patterns and trends as described above with respect to FIG. 5. Each of the user selected refinements corresponds to a different subcategories containing corresponding datasets in the backend. The detection of corrections among the concepts and variables may be based on the knowledgebase components within the data repository 206 of FIG. 3, as described in more detail above. The pattern detection process analyzes the refined and organized datasets for relationships between two or more categories or subcategories identify variable relationships, as well as null trends (where there are only independent variables, and no pattern trend is detectable).

In step 816 of the "what" pipeline, the various patterns and trends may be formatted to visually display the general connections among the data and data categories and organization refined in step 854, as described above with respect to FIG. 5. The concepts and variables are separated into datasets or patterns depending upon categorical relationships to the user's selected variables. The trends and patterns may be presented in tree-branch diagram format for optimal display of the presence of correlating variables and concepts for user selection, as shown in FIG. 5.

In step 818 of the "what" pipeline, the types of analytics that may be performed on the refined data scrape (after user selection of pattern from step 816) may be derived and determined. Such analytics types may be determined using factors such as the degree of interconnectedness of variables within selected trends and patterns, the number of variables present, the categories/sub-categories included in each trend or pattern, the nature of the corresponding predictions, and other factors. The analytics types may be determined using, for example, trained models including regression algorithms and/or neural networks.

In step 819 of the "what" pipeline, format options for analysis of the selected trends or pattern may be determined and presented to user for selection based on relevance. For example, in step 819, it may be determined based upon the trends and patterns selected by the user and the type of analysis performed, the best visual presentation of an analysis of each correlating dataset among, for example, graphical illustration, charts, tables, texts, and other formats. Further in step 819, at least one visual analysis format will be determined for each user-selected trend or pattern for the final report. Each trend or pattern may be presented in more than one separate formats. The report formats determined by the pattern machine may be presented to the user for selection.

Further for step 819, the report formats automatically suggested by the pattern machine may be further based on prior user selection of report format for similar or related queries. For example, when the user selects a pie chart as the format for presentation of the final report to their previous questions, the pattern machine may associate such user selection, a pie chart, with the patterns and the type of concepts, knowledge items and datasets associated with the previous questions. As such, the pattern machine then learns that a pie chart is an appropriate and popular visual format for illustrating the type of data associated with these patterns. The pattern machine can then implement such knowledge as learned in step 819 next time the user is looking at similar patterns and datasets and may, for example, suggest a pie chart as a format for presentation of similar numerical data in the final report.

Step 858 of the "why" pipeline performs predictive analytics on refined data from the steps above and generates predictive answer to the query along with descriptive presentation of predictive analysis performed on all relevant data, as described above with respect to FIGS. 3 and 6 according to user selected report format.

The prediction as performed in step 858 of FIG. 8 by the predictive engine 316 of FIG. 3 may be based on both historical, contemporary (or present), and futuristic data scraped from the data source 201-214 and data repository 206 of FIG. 2. The futuristic data may be alternatively predicted using various machine learning models from the historical and contemporary data. In some implementations, a differentiation between historical/present data and futuristic data may be made and a "contemporary answer" to the query to be simultaneously developed along with the full predictive results described above. For example, rather than using the full historical, present and futuristic data, the contemporary answer may be based on only historical and present data. During the data analytics processes described above, both types (full predictive and contemporary) of answers may be simultaneously developed through the refinement of data by keeping track of the scope of input of data (with respect to its time characteristics) to the predictive engine 316 of FIG. 3. In other words, throughout the process from query to final report, data that is relevant to today (historical data and present data) and data that is relevant to tomorrow may be distinguished. While both the full predictive and contemporary answers are "predictive" with respective to the various predictive algorithms used in the predictive engine 316 of FIG. 3, all data may be used in the analytics for the full predictive answer to the input query whereas only the historical and present data are used for data analytics with respect to the contemporary answer to the input query. In some implementation, the futuristic answer may be developed intelligently using various machine learning models based on the contemporary answer and the futuristic data.

The contemporary answer may be included in the final report or may be presented in a separate report for the user to compare it with the fully predictive answer, in order to render more accurate picture of the answer to the input query. The fully predictive answer provides an additional trajectory of the data analysis currently relevant to the topic in question. Both the contemporary and the predictive answers may be saved and stored in the data repository 206. When the reports and the data repository are updated (e.g., periodically or triggered), both the fully predictive answers and contemporary answers are updated. During data scraping process for updates, the data used in the data analytics of these answers may be adjusted. For example, historical and present data may be tracked in real-time and futuristic data may become present or historical if verified and removed if invalidated as time goes by. I some implementations, the data analytics for the contemporary answer may be performed first and the fully predictive answer may be considered as dependent on the contemporary answer and may be derived or adjusted from the contemporary answer by further considering future data in additional data analytics and prediction steps. Once the contemporary answer portion of the final report has been calculated and its data has been compared according to predictive relevance, the fully predictive analysis may be performed and aggregated onto the final report and provided to the user.

The comparative analytics above between the contemporary and fully predictive answers may be used for preforming analysis of margin of errors of the predictions, which as described above, may be included in the automatically generated report in step 860. For example, the margin of error may be calculated for the contemporary answer and then factored into the margin of error estimation of the fully predictive answer. The margin of error for the prediction may be based on margin of errors in the underlying dataset and margin of errors pertaining to the predictive algorithms used in the data analytics, which may be estimated by the pattern machine. The margin of error in the underlying dataset may be further used in data screening or filtering. In other words, the margin of error in the underlying dataset may be used to determine the dataset that may be introduced into the predictive algorithm for predictive analytics. Dataset that is, for example, above a predetermined threshold of margin of error may be removed from consideration in the predictive analytics described above.

In some implementations, the pattern machine performs fact checking including not only the direct validation of the datasets as described above, but also validation of datasets using a tracking of user selection of concepts, knowledge patterns, and report format, as well as supplemental information entered with user query and pattern recognition in public domain. Such information may be taken into consideration in the data filtering and margin of error estimation described above.

Figure 9:
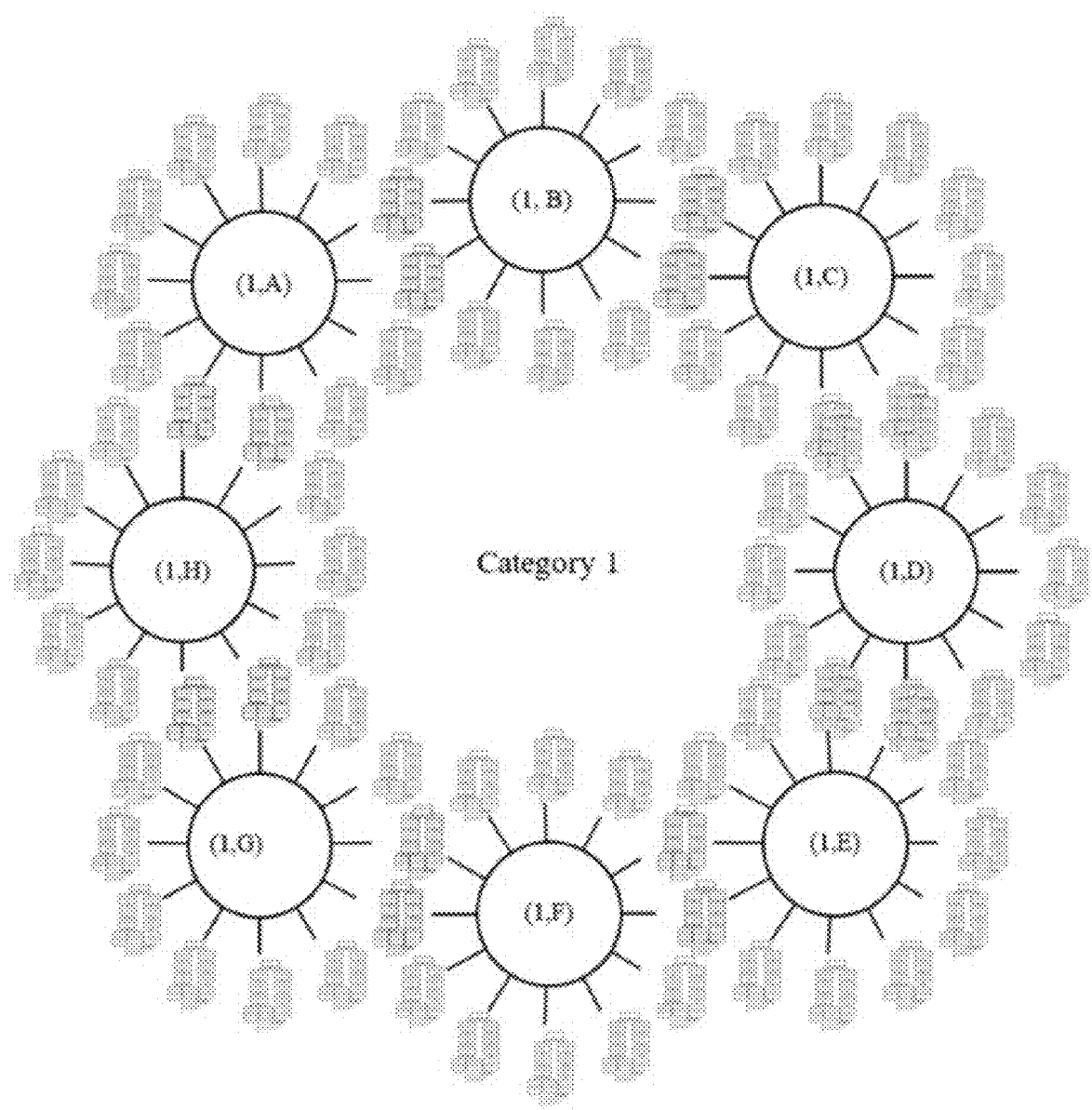
FIG. 9 illustrates an example organization of concept in categories and subcategories.
Figure 10:
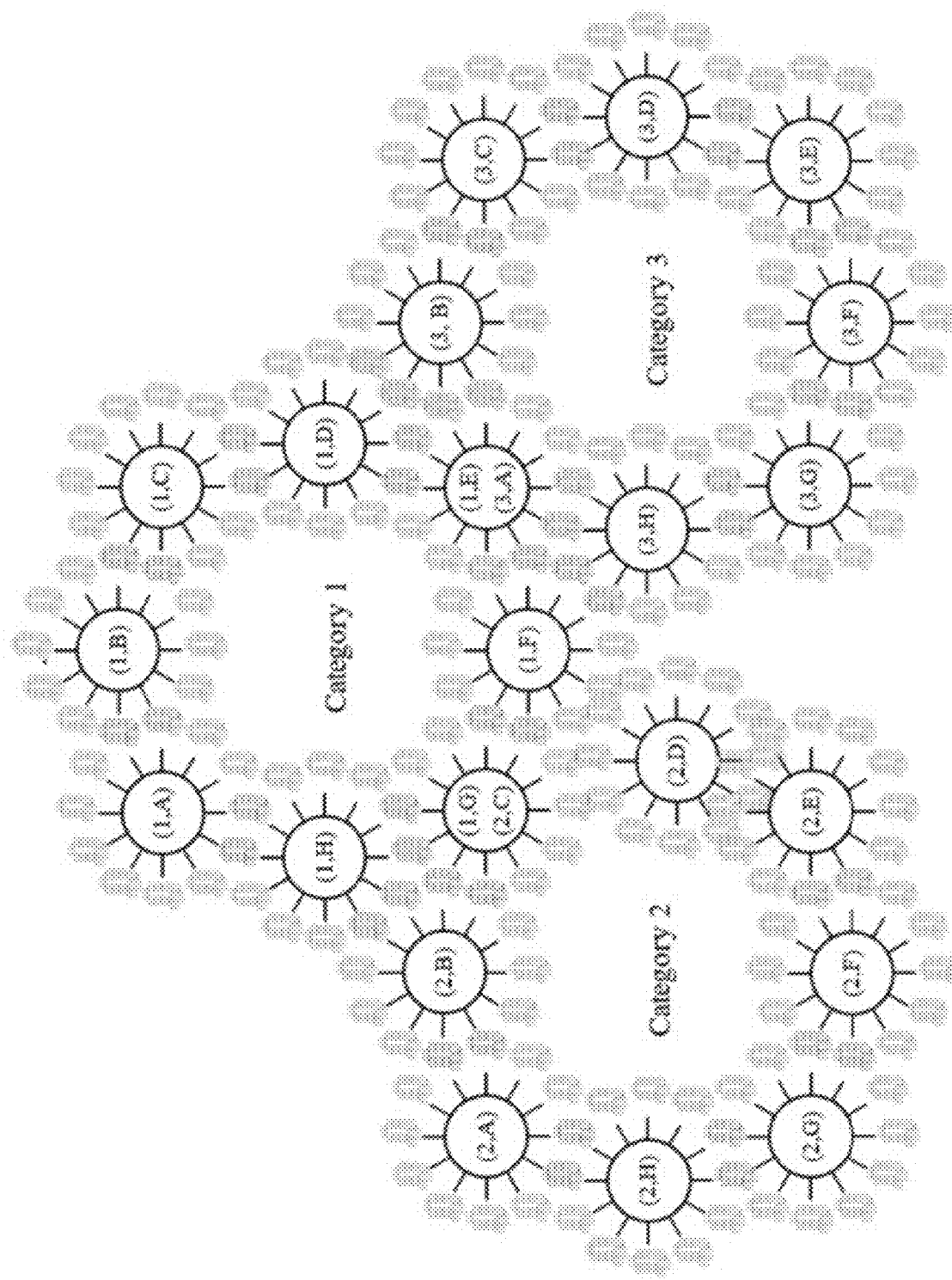
FIG. 10 illustrates another example organization of concept in categories and subcategories.

In some implementations, data or datasets (including the queries, the data in the concept/variable repository 322, the knowledge pattern repository 324, the report repository 326 and the bibliographical repository 328 in FIG. 3) maybe organized by categories and/or subcategories (or in domains or subdomains). Examples of domains or categories may include user's areas of interest (e.g., transportation, education, agriculture, entertainment, and the like). Adjustment of such organization of the data may be made continuously, periodically, or in other manners as new data is being scraped and ingested. The delineation of the categories and subcategories may be configured to be dynamically adjusted as the pattern machine expands by processing increasing number of queries. As the number of query increases, subject matters included in the previous domains or categories may begin to overlap. The pattern machines described above may in turn generate different domain/category organization based on such overlap. The domain or categories organization may be hierarchical. The pattern machine may maintain and keep track of overlap between subcategories with a particular category. For example, FIG. 9 shows a visual representation of how a single category (category "1") is maintained with its various subcategories (represented by "A"-"H" branches). FIG. 9 shows that the subcategories within category 1 may overlap as indicated by the shared branches between the boundaries of the subcategories. Likewise, FIG. 10 shows several categories (category 1 through 3) with overlapping subcategories between them. For example, categories 1 and 2 overlap at the subcategory labeled as (1, G) and (2, C), category 1 and 3 overlaps at the subcategory labeled as (1, E) and (3, A). Likewise, subcategory branches within each category may overlap, similar to FIG. 9. The overlap between the categories and between subcategories within each category in FIGS. 9 and 10 is tracked by the pattern machine and may be updated continuously, periodically, or in other manners. FIGS. 9 and 10 are merely examples showing the organization of the categories and subcategories. There may be any number of levels and the overlap within each level and between the levels are tracked by the pattern machine. Such organization may be implemented using any type of database, such as a knowledge graph modified to track overlap between various entities in a graphical database.

With respect to the dynamic aspect of the data and concept categorization, rather than categorization/classification of data that is binary and static, dynamic categorization may involve an association of data according to factors that can change, accumulate, diminish, and intersect over time. Dynamic categorization may be employed for a constantly updating system when information shifts over time. In some implementations, dynamic categorization may include algorithms that assign functional code to a data item as a format of typology that allows the data to possess a fixed categorical position only for as long as it is not updated. When the data item is updated, the functional code may reassign a new relevant categorical position for the data item to maintain an accuracy in temporal relevancy. Such functional code may be generated using machine learning models and may be configured to run when triggered by a new input query and/or other data update. The functions of the source code generated and assigned to a particular data item or dataset may change over time to relate the data item or dataset to any number of other data items/dataset or variables of the system.

For example, a data item relating to a laboratory study on holistic remedies to Alzheimer's may be pulled into the database as a result of processing of a new user query. At the onset, functional code may be automatically assigned to the data item that classifies the data item as a variable set corresponding to the major categories "healthcare" and "wellness" and the subcategories "aging" and "holistic medicine." However, at a later time, e.g., 6 months later, the viewpoint of the public may have shifted in regard to holistic wellness, and it is now considered a "science." Such concept shift may be automatically detected by some machine learning component in the knowledge pattern machine. An update of the original functional code for this data item may be triggered. The modified functional code further triggers re-categorization of the data item to account and accommodate for temporal relevance. As a result, the data item would be updated to as belonging to and linked with the category of "science." The categorization and dynamic re-categorization process may be driven by machine-learning technologies in that the system may be configured to self-generate changes to the functional codes assigned to any data/dataset as more data are ingested and analyzed by the knowledge pattern machine.

In some implementations, the update of the prediction, the report, and the data repository may be managed by a triggering mechanism. As described above, such update may be triggered continuously, periodically, on demand, and in any other manners. For example, the knowledge pattern machine may automatically preform update as triggered each time a new query is entered. Upon receiving a new query, the pattern machine may set off a system trigger which re-runs every previously asked query or a subset of previously asked queries (which is saved in the data repository) as determined by the knowledge pattern machine using the corresponding algorithmic process to these queries (which are also tracked and saved at each step in the process in the data repository). This may include, but is not limited to, re-running a comparison of new data against the old data. In this manner, if any new information/data is available, the prediction, the report, and other relevant data items in the data repository are updated. If the relevance of new information captured in the update is significant enough to change any step of a query-report process that a user has saved, that user will be automatically informed of the updates. The user can then alter the refinements of their query in whatever manner has become relevant, view the updated final predictive report and answer, or pose a new query.

In some implementations, the input query management/variable extraction engine may configured to further determine types of problems and solutions that are dynamically connected to the user's input query. For example, if the user asks a question that begins with "how," the input query management/variable extraction engine may not only extract various concepts and patterns embedded in the query but also identify that the query is related to "how to." The input query management/variable extraction engine thus triggers a generation of a "how to" guide relevant to the extracted concepts and patterns. The knowledge pattern machine may then be further triggered to include into the final report the "how to" guide in addition to analytics of the embedded concept and patterns. Such a "how-to" guide may direct the user to a solution pointing to a future time. As such, the final report may go beyond rendering a simple predictive analysis of concepts embedded in or expanded from the input query and may also create a prediction-related solution to the query. By generating novel information from the query analytics, the final report may present not only a prediction, but also answer(s) that are relevant at some future point, how to get there, and generate solutions to achieving the future answer. For example, the newly generated further solution in the final report may include information such as machine-developed computer code or equation as a solution to the problem identified in the input query. The generation of such solution-based information may be accomplished using predictive AI.

In some implementations, the query analytics process may further be configured to identify and resolving gaps in the query and information/knowledge/data. For example, an incomplete mathematical equation could be entered by the user. The knowledge pattern machine system may be configured to use intelligent predictive analytics to complete the equation.

In some implementations, the pattern machine described above may be configured to delineate the management of personal data and public data in performing predictive data analytics. Personal data may be managed individually for each user of the pattern machine. Additional options may be provided to a user to either perform the various predictive analytics using only personal data, only public data, or both. As such, the space in which the predictive data analytics may be controlled and tailored to individual need and preference. The pattern machine may further be configured to perform intelligent comparative analysis of predictions performed using the personal data, using public data, or using both personal and public data. Such comparison may be further provided as part of the report generated for a particular query. Tracking of personal data and public data may be updated continuously, periodically, or in any other manners, as the delineation between personal and public data may change over time. Personal data may include data input by a user as pertaining to the user and may further include data items derived from user data by the pattern machine.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A system for generating a predictive pattern recognition knowledge base, comprising:
a database;
a circuitry configured to:
receive an input query from a user;
automatically generate a set of knowledge items based on the input query;
automatically categorize the set of knowledge items;
automatically generate at least two selectable knowledge patterns as alternative refinements of the input query, each in a form of a visual or textual representation of correlation between at least two of the set of knowledge items;
perform predictive data analytics of data associated with the input query aggregated from disparate data sources to generate a prediction based on one or more of the at least two alternative and selectable knowledge patterns selected by the user from the at least two alternative and selectable knowledge pattern;
generate a report for the prediction for presentation to the user and for storage in the database; and
automatically update the predictive graphical or textual report in the database at a later time and in absence of further user query by:
updating the data associated with the input query when being triggered by an indication that the data has changed; and
updating the predictive data analytics of the one or more of the at least two alternative and selectable knowledge patterns based on the updated data to generate an updated prediction report,
wherein the database is configured to store data personal to the user and public data with respect to the user, and wherein the circuitry is configured to perform a first predictive data analytics only using the data personal to the user.

2. The system of claim 1, wherein the circuitry is configured to automatically categorize the set of knowledge items by associating functional codes to each of the set of knowledge items for dynamically categorizing the set of knowledge items.

3. The system of claim 2, wherein the functional codes associated with each of the set of knowledge items are automatically selected using one or more machine learning models.

4. The system of claim 2, wherein the functional codes associated with each of the set of knowledge items are configured to be automatically triggered to execute to dynamically categorize the set of knowledge items.

5. The system of claim 2, wherein the function codes associated with each of the set of knowledge items comprises executable machine codes or interpretable scripts.

6. The system of claim 2, wherein the function codes associated with each of the set of knowledge items is assigned by at least one algorithm as a topological format that allows each of the set of knowledge items to possess a fixed categorical position only as long as it is not updated, and wherein when the knowledge item is updated, the functional codes are configured to reassign a new relevant categorical position for the knowledge item to maintain an accuracy in temporal relevancy.

7. The system of claim 1, wherein the circuitry is further configured to:
automatically categorize the set of knowledge items in a hierarchical category structure; and
dynamically update the hierarchical category structure in response to a trigger.

8. The system of claim 7, wherein the trigger comprises one of a periodic trigger, a detection of change of the data, and another input query from any user.

9. The system of claim 1, wherein the circuitry is configured to update the hierarchical category structure by generating a new category or a subcategory from the hierarchical category structure based on a structural analytics of the hierarchical category structure.

10. The system of claim 1, wherein to automatically generate the set of knowledge items, the circuitry is configured to:
apply a semantic model to the input query to extract a first set of knowledge items from the input query; and
expand the first set of knowledge items to generate the set of knowledge items based on the first set of knowledge items and other knowledge items stored in the database.

11. The system of claim 1, wherein to automatically generate the set of knowledge items, the circuitry is configured to:
process the input query using at least a first data analytics algorithm and a second data analytics algorithm,
wherein the first data analytics algorithm is configured to extract format, structural, or topological information items from the input query, and the second data analytics algorithm is configured to extract content knowledge items from the input query.

12. The system of claim 1, wherein to perform the predictive data analytics of the data associated with the input query to generate the prediction, the circuitry is configured to generate a contemporary answer to the input query and a futuristic answer to the input query.

13. The system of claim 12, wherein the circuitry is configured to generate the contemporary answer to the input query by performing data analytics on a first portion of the data associated with the input query that are either historical or present.

14. The system of claim 13, wherein the circuitry is configured to generate the futuristic answer to the input query by performing data analytics on a second portion of the data associated with the input query that are at least partially predicted future data.

15. The system of claim 14, wherein the report comprises a comparison between the contemporary answer and the futuristic answer.

16. The system of claim 14, wherein the circuitry is configured to generate the contemporary answer by processing the first portion of the data using a machine learning model, and to generate the futuristic answer by separately processing the second portion of the data using the machine learning model.

17. The system of claim 14, wherein the circuitry is configured to generate the contemporary answer by processing the first portion of data using a first machine learning model, and to generate the futuristic answer by separately processing the contemporary answer and the at least partially predictive future data using a second machine learning model.

18. The system of claim 1, wherein the circuitry is configured to perform a second predictive data analytics separately based at least partially on a portion of the public data.

19. The system of claim 1, wherein the circuitry is configured to include a comparison of the first predictive data analytics and the second predictive data analytics in the report.

20. The system of claim 1, wherein the circuitry is further configured to automatically determine a format of the report for the prediction based on a semantic analytics of the input query.

21. The system of claim 20, wherein the format of the report for the prediction comprises a selection from at least one of a plurality of graphical and textual components.

22. The system of claim 1, wherein the circuitry is further configured to filter the data associated with the input query based on an accuracy analysis and use the filtered data for the predictive data analytics to generate the prediction.

23. A method for generating a predictive pattern recognition knowledge base, comprising:
receiving an input query from a user;
automatically generating a set of knowledge items based on the input query;
automatically categorizing the set of knowledge items;
automatically generating at least two selectable knowledge patterns as alternative refinements of the input query, each in a form of a visual or textual representation of correlation between at least two of the set of knowledge items;
performing predictive data analytics of data associated with the input query aggregated from disparate data sources to generate a prediction based on one or more of the at least two alternative and selectable knowledge patterns selected by the user from the at least two alternative and selectable knowledge pattern;
generating a report for the prediction for presentation to the user and for storage in a database; and
automatically updating the predictive graphical or textual report in the database at a later time and in absence of further user query by:
updating the data associated with the input query when being triggered by an indication that the data has changed; and
updating the predictive data analytics of the one or more of the at least two alternative and selectable knowledge patterns based on the updated data to generate an updated prediction report,
wherein the database is configured to store data personal to the user and public data with respect to the user, and wherein the circuitry is configured to perform a first predictive data analytics only using the data personal to the user.

24. The method of claim 23, further comprising categorizing the set of knowledge items by associating functional codes to each of the set of knowledge items for dynamically categorizing the set of knowledge items.

25. The method of claim 23, further comprising performing the predictive data analytics of the data associated with the input query to generate the prediction comprises generating a contemporary answer to the input query and a futuristic answer to the input query.

* * * * *